US012559191B2

(12) United States Patent
Marchetta

(10) Patent No.: US 12,559,191 B2
(45) Date of Patent: Feb. 24, 2026

(54) RIDEABLE SADDLE VEHICLE PROVIDED WITH DETECTION UNIT

(71) Applicant: PIAGGIO & C. SPA, Pontedera (IT)

(72) Inventor: Francesco Marchetta, Pontedera (IT)

(73) Assignee: PIAGGIO & C. SPA, Pontedera (IT)

( * ) Notice: Subject to any disclaimer, the term of this patent is extended or adjusted under 35 U.S.C. 154(b) by 0 days.

(21) Appl. No.: 18/573,576

(22) PCT Filed: May 26, 2022

(86) PCT No.: PCT/IB2022/054970
§ 371 (c)(1),
(2) Date: Dec. 22, 2023

(87) PCT Pub. No.: WO2023/275635
PCT Pub. Date: Jan. 5, 2023

(65) Prior Publication Data
US 2024/0286700 A1    Aug. 29, 2024

(30) Foreign Application Priority Data
Jul. 2, 2021    (IT) ........................ 102021000017471

(51) Int. Cl.
*B62J 45/42*        (2020.01)
*B62J 15/00*        (2006.01)
*B62J 27/00*        (2020.01)

(52) U.S. Cl.
CPC .............. *B62J 45/42* (2020.02); *B62J 15/00* (2013.01); *B62J 27/00* (2013.01)

(58) Field of Classification Search
CPC ... B62J 45/42; B62J 15/00; B62J 45/40; B62J 6/04
See application file for complete search history.

(56) References Cited

U.S. PATENT DOCUMENTS 7,832,751 B2 * 11/2010 Fischer .................... B62J 15/00
280/154
10,131,401 B2 * 11/2018 Nolin ..................... B62K 5/027
(Continued)

FOREIGN PATENT DOCUMENTS

EP        3263432 A1    1/2018
EP        3453600 A1    3/2019
(Continued)

OTHER PUBLICATIONS

Computer generated English translation of JP 2016-147619 (Year: 2025).*
(Continued)

*Primary Examiner* — Paul N Dickson
*Assistant Examiner* — Tiffany L Webb
(74) *Attorney, Agent, or Firm* — CANTOR COLBURN LLP

(57) ABSTRACT

A rideable saddle vehicle including: a taillight arranged on a rear-carriage of the vehicle, the taillight being adapted to emit a light beam; a rear fender of a rear wheel connected to an unsprung mass portion of the rear-carriage, the rear fender having a front edge and a rear edge; a detection unit arranged on the rear-carriage and configured to detect the presence of other vehicles in a zone behind the vehicle, where the detection unit, in a side view of the rideable saddle vehicle, is arranged below the taillight, above the rear edge of the rear fender, behind the front edge of the rear fender and in front of the rear edge of the rear fender.

11 Claims, 3 Drawing Sheets

(56)  References Cited

U.S. PATENT DOCUMENTS

| 10,625,802 | B2 * | 4/2020 | Suzuki ................ B62K 25/005 |
| 11,390,345 | B2 * | 7/2022 | Ishikawa ................ B62J 6/055 |
| 2012/0073893 | A1 * | 3/2012 | Muroo ................... B62K 11/04 |
| | | | 180/311 |
| 2019/0161042 | A1 * | 5/2019 | Fuchs .................... B62J 45/422 |
| 2021/0001945 | A1 | 1/2021 | Hagimoto et al. |
| 2024/0227967 | A1 * | 7/2024 | Bucchioni ............... B62J 45/42 |

FOREIGN PATENT DOCUMENTS

| EP | 3263432 | B1 | * | 4/2020 | .............. B62J 11/19 |
| JP | 2001151016 | A | | 6/2001 | |
| JP | 4544440 | B2 | | 7/2010 | |
| JP | 2016147619 | A | * | 8/2016 | .............. B62J 15/00 |
| JP | 2017039487 | A | * | 2/2017 | |
| JP | 2018001812 | A | * | 1/2018 | .............. B62J 11/19 |
| JP | 2018158670 | A | * | 10/2018 | .............. B62J 15/02 |
| JP | 2019209960 | A | * | 12/2019 | |
| JP | WO2020045394 | A1 | * | 8/2020 | |

OTHER PUBLICATIONS

Computer generated English translation of JP 2017-039487 (Year: 2025).*
Computer generated English translation of JP 2018-001812 (Year: 2025).*
Computer generated English translation of JP 2018-158670 (Year: 2025).*
Computer generated English translation of JP 2019-209960 (Year: 2025).*
Computer generated English translation of WO 2020/045394 (Year: 2025).*
International Search Report for corresponding application PCT/IB2022/054970 filed May 26, 2022; Mail date Sep. 13, 2022.
Written Opinion for corresponding application PCT/IB2022/054970 filed May 26, 2022; Mail date Sep. 13, 2022.

* cited by examiner

RIDEABLE SADDLE VEHICLE PROVIDED WITH DETECTION UNIT

TECHNICAL FIELD

The present disclosure relates to the field of two- or three-wheeled rideable saddle vehicles, and, in particular, to a rideable saddle vehicle provided with a detection device, such as a radar device.

BACKGROUND

The application of one or more radar devices to a rideable saddle vehicle, such as a two- or three-wheeled motorcycle, is known.

Indeed, motorcycles are subject to a risk of collision by the vehicles behind them more than other vehicles, such as cars, for example, for various reasons. Therefore, it is necessary to alert the driver of the vehicle of the presence of other vehicles behind the motorcycle so that the driver is informed of the situation surrounding the motorcycle and can respond actively and in advance, e.g., with a corresponding driving maneuver, to any hazardous situations that may arise.

In this specific application, the position of the radar device on the vehicle and its functional efficiency is important to make the information that is transmitted to the driver as accurate as possible.

It is known to mount the radar device in different positions on the vehicle. For example, a radar device attached to the rear-carriage of a two-wheeled motorcycle is described in US20210001945A1. Further examples are described in patents EP3453600 and JP4544440. In particular, in these solutions, the detection device is arranged on the tail of the rear-carriage in a position comprised between the taillight of the vehicle and a rear fender which accommodates the license plate of the vehicle.

In vehicles described in these documents, the rear fender extends and branches directly from the rear-carriage. In particular, it protrudes inferiorly from a portion of the rear-carriage frame to be contiguous with the rear-carriage itself.

However, this positioning of the detection device partially screens the view of the radar because the rear fender and the license plate holders are too close to the radar, creating a kind of shadow cone, in which the radar cannot detect obstacles or dangers.

There are also motorcycles with so-called low fenders, i.e., arranged directly near the rear wheel, in the prior art. An example of this is provided by document EP3263432. In these solutions, the fender is directly connected to the wheel hub and thus follows the sussultatory movements of the rear wheel.

BRIEF SUMMARY

The disclosure provides a rideable saddle vehicle having at least one detection device arranged in a rear-carriage position which makes it possible to optimize the efficiency of the radar device to increase its field of view and protect the detection device from water or mud projected from the rear wheel at the same time.

The disclosure further provides a rideable saddle vehicle provided with at least one detection device to reduce the probability of false signals from the latter.

These and other purposes are achieved by a rideable saddle vehicle comprising:

a taillight arranged on a rear-carriage of said vehicle, wherein said taillight is adapted to emit a light beam on a rear side of the vehicle;

a rear fender of a rear wheel arranged at said rear-carriage; wherein said rear fender is connected to an unsprung mass of the rear-carriage; said rear fender comprising a front edge and a rear edge;

a detection unit arranged on said rear-carriage and adapted to detect the presence of other vehicles behind the vehicle;

wherein said detection unit is arranged, in a front side or rear view of the vehicle:

below the taillight, above said rear edge of the rear fender, behind said front edge of the rear fender and in front of said rear edge of the rear fender.

A similar positioning of the detection unit, in particular, when it is a radar, allows it to ensure a wide angle of detection of the unit and at the same time to not expose the unit to mud or water coming from the rear wheel.

Indeed, the detection unit is arranged in a space in the rear-carriage of the vehicle which is free of obstacles that may alter the detection of the detection unit. Said positioning, in combination with the mounting of the rear fender on an unsprung mass of the vehicle, ensures a better field of view for the detection unit. Furthermore, the positioning within the front and rear edges of the fender guarantees that the detection unit will not be hit by a stream of water, debris or mud, on rainy days.

The rear fender extends an arc of circumference about the rear wheel. The fender is either directly or indirectly connected to the element configured to allow vertical oscillatory movement of the rear wheel of the vehicle.

Furthermore, the combination of providing the rear fender integral with an unsprung mass of the vehicle, and arranging the detection unit housed between the taillight and the rear fender following a vertical direction, makes it possible to extend the field of view of the instrument and thus its detection efficiency.

The term "unsprung mass" means a portion of the vehicle which is not damped by the shock absorbers of the vehicle. At the rear-carriage, an unsprung mass of the vehicle is, for example, the rear swingarm and/or the rear wheel. The term "swingarm" is generally intended to mean any element designed to connect the rear wheel to the vehicle frame to allow a sussultatory movement. This term also includes the traditional scooter engine which, at the front, is connected to the frame and, at the rear, directly to the rear wheel. The rear fender, being connected to an unsprung mass of the rear of the motorcycle, is arranged at a distance from the taillight of the vehicle.

In the text, the terms rear, front, top, bottom, right, left, and any of their synonyms or adverbs refer to vehicle 1, as indicated by the Cartesian axes depicted in the figures showing the up-down (U-D), right-left (R-L), and front-back (F-B) directions.

In particular, the detection unit is arranged in a position defined according to a direction from the top downwards and according to a side view, selected from:

a) a position, in which said detection unit is proximal to said taillight and spaced from said rear fender;

b) a position, in which said detection unit is proximal to said rear fender and spaced from said taillight;

c) a position, in which said detection unit is substantially equally spaced from said taillight and said rear fender.

In all cases (a), (b), and (c), the detection unit is without shielding from further parts of the vehicle adjacent thereto. The radio signal emitted by the detection unit is free to propagate to the rear of the rear-carriage. The achieved operating range, which is direct function of said radio signal, makes it possible to increase the efficiency of the detection unit.

Advantageously, the detection unit is arranged aboard a portion of a rear-end frame. In this case, the detection unit is arranged integrally to a rear-carriage of the vehicle.

In particular, the detection unit is located below the taillight integral with a portion of the rear-carriage frame of the vehicle.

Alternatively, the detection unit is arranged at the edge of the rear fender.

In this case, the detection unit is located on the rear fender and is connected to an unsprung mass of the vehicle. The detection unit is thus always placed in a position below the tail light, but distanced from it and from the tail of the rear-carriage itself.

Advantageously, the detection unit is arranged on a license plate holder installed on said rear fender.

In particular, said portion of unsprung mass comprises a portion of a swingarm of the rear wheel of said vehicle which connects the rear wheel to the rest of the vehicle. In this manner, the rear fender is connected either directly or indirectly to the swingarm of the vehicle, which represents an unsprung mass of the vehicle.

In a preferred embodiment, said rear fender is connected to said swingarm portion in at least one attachment point, said attachment point in a side view of the vehicle being arranged within the volume defined by said rear wheel.

Preferably, the rear fender is connected to said swingarm by means of an arm which extends from the swingarm and supports the fender in a cantilevered position so as to be proximal to the rear wheel. The fender is connected to the swingarm in at least one connection portion which falls—in a side view—within a volume defined by the rear wheel.

Advantageously, said detection unit is arranged on a supporting bracket. The supporting bracket in particular is attached to the rear-carriage portion of the chassis and extends to support the detection unit; for example, the support bracket is substantially L-shaped.

Advantageously, a rideable saddle comprises damping elements adapted to damp the vibrations of the supporting bracket and/or of said detection unit while driving. In this manner, the damping elements make it possible to limit and reduce the vibrations experienced by the detection unit mounted on board the supporting bracket.

Preferably, the damping elements are rubber elements arranged at an attachment portion of the supporting bracket, e.g., at the rear-carriage frame portion. Either alternatively or in combination, the damping elements are placed in an interposed position between the supporting bracket and the detection unit. In this manner, the rubber elements reduce the vibrations of the bracket and of the detection unit that is substantially suspended on a shock-absorbing rubber cushion.

BRIEF DESCRIPTION OF THE DRAWINGS

Further advantages and additional features of the present disclosure are evidenced by the following description of some embodiments, made by way of non-limiting example, with reference to the appended drawings, in which.

DETAILED DESCRIPTION

Figure 1:
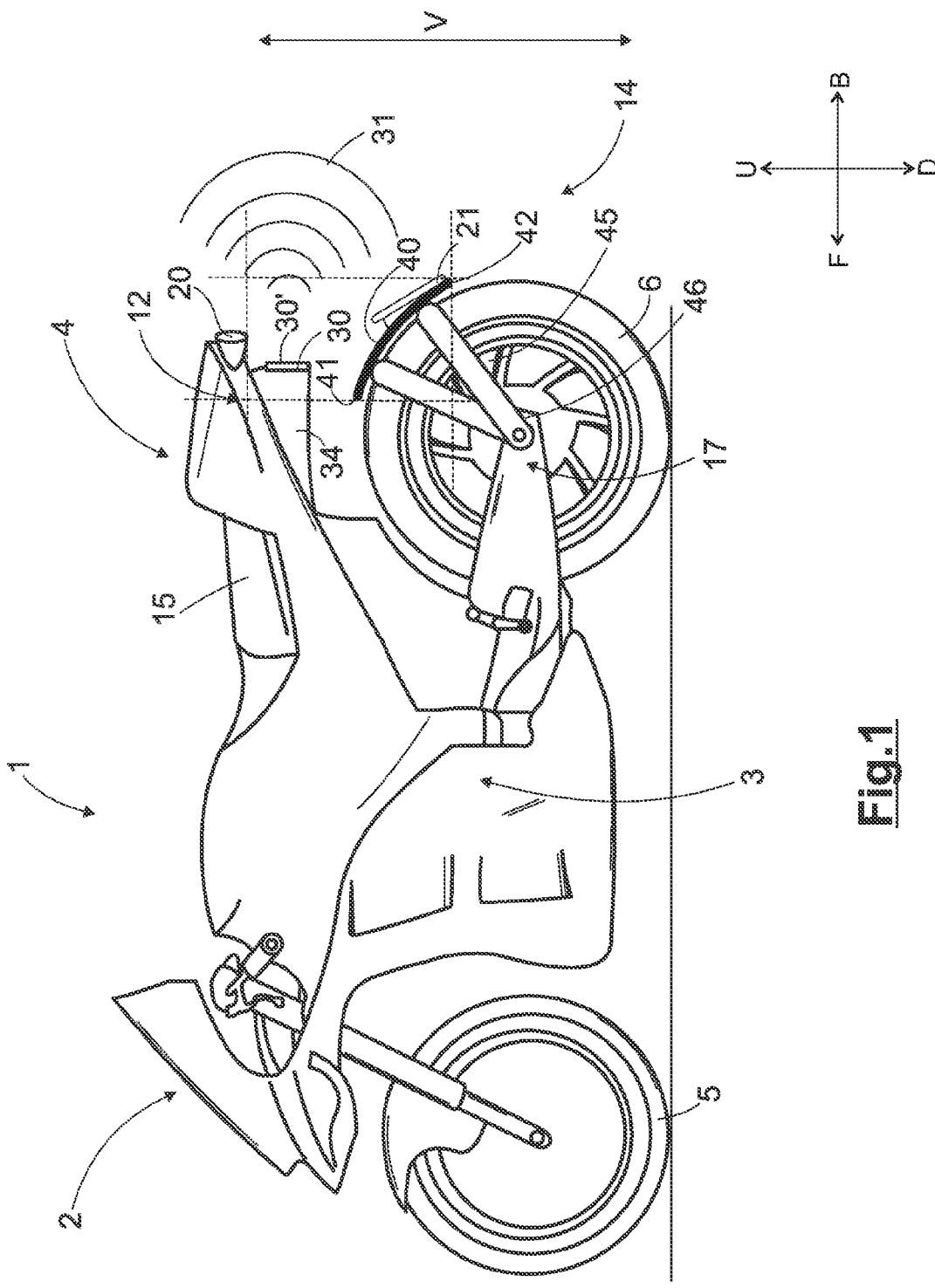
FIG. 1 shows a side view of a rideable saddle vehicle, in particular a motorcycle, provided with the detection unit according to the present disclosure.

Equal or similar elements are indicated with the same reference numerals in the accompanying drawings.

Figure 5:
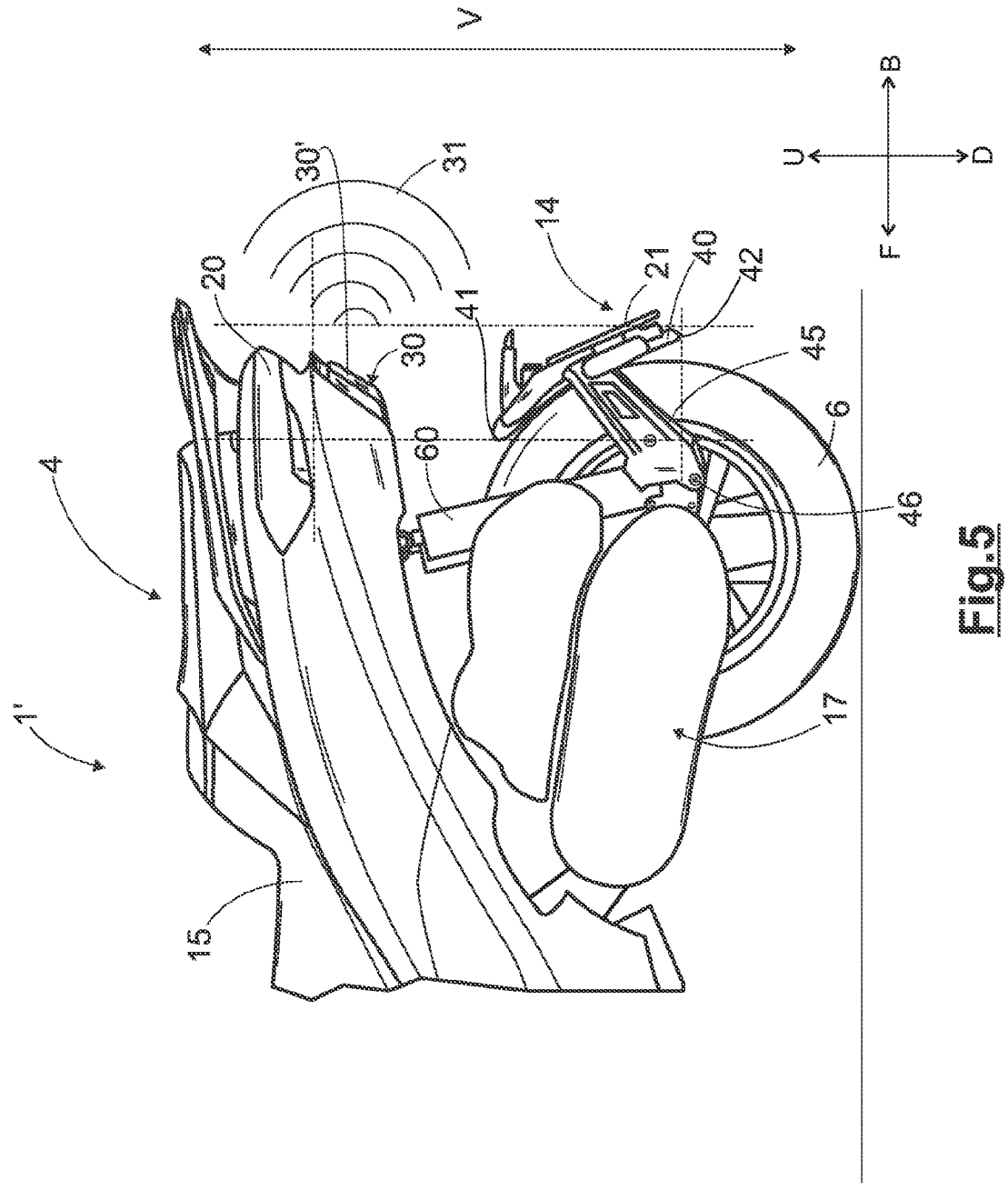
FIG. 5 shows a partial side view of a rideable saddle vehicle, in particular the rear-carriage of a scooter, provided with the detection unit according to the present disclosure.

An embodiment of a motorcycle 1,1' is shown in the appended figures, which in the particular example without because of this introducing any limitation, is embodied in a two-wheeled motorcycle 1 and, in particular, in a motorcycle in FIG. 1 or a two-wheeled scooter 1' in FIG. 5 having a front wheel 5 and a rear wheel 6, or even in a three-wheeled tricycle having at least two steerable and tilting front wheels, or a quadricycle with two pairs of tilting wheels of which at least two are steerable.

Henceforth in this description, reference will be made to a generic motorcycle 1, 1' meaning that the description of the following is generally applicable to any type of motorcycle comprising a motorcycle body 2,3,4; at least two wheels 5, 6 connected to the motorcycle body 2,3,4; a traction motor, e.g., a heat and/or electric or hybrid motor, constrained to the motorcycle body 2,3,4 and operatively connected to at least one of the two wheels 5,6.

The motorcycle body thus comprises a front portion 2, a middle portion 3 provided with a seat 15, and a rear portion or rear-carriage 4.

The motorcycle 1 further comprises a taillight 20 arranged on a rear-carriage 4. The taillight 20 can emit a rearward light beam.

A rear fender 40 is also provided arranged at the rear 4 of the vehicle. The rear fender 40 is shaped to mount a vehicle license plate. The rear fender 40 is connected to an unsprung mass 14 of the vehicle. Therefore, the rear fender 40 is arranged spaced apart from the taillight 20 of the vehicle.

The motorcycle 1 further comprises a detection unit 30 adapted to detect the presence of other vehicles following the motorcycle or alongside it. The detection unit 30 is, for example, a radar. The radar device transmits a transmission wave, which is the electromagnetic wave to detect the surrounding environment, from a transmission/reception portion, and receives a reflected wave when the transmission wave is reflected by an object behind the vehicle.

The detection unit 30 is arranged below the taillight 20 and above the rear edge 42 of the rear fender 40.

In this manner, the detection unit 30 is arranged in a free space of the rear portion 4 of the vehicle, defined according to a direction V from the top downwards, at a position between the taillight 20 and the rear fender 40, the latter mounted on an unsprung mass 14 of the vehicle. Said positioning, in combination with mounting the rear fender 40 on an unsprung mass of the vehicle, provides a better field of view for the detection unit 30, because it is not affected by shielding of parts of the motorcycle adjacent thereto.

In other words, this expedient of arranging the detection unit 30, as defined above, makes it possible to reduce false signals generated by the detection unit 30, e.g., when the motorcycle is cornering or changing direction. The positioning of the detection unit 30 according to the present disclosure allows the field of view to be enlarged, thereby improving the reliability of detecting other vehicles approaching from the rear and/or side of the motorcycle and consequently reducing false signals due to, e.g., detections of other objects near the road while driving.

The unsprung mass is thus a portion of the vehicle which is not damped by the shock absorbers 60 (FIG. 5). The shock absorbers 60 cushion the stresses caused by the contact of the wheels 5,6 with the road surface. At the rear-carriage 4, an unsprung mass of the vehicle is, for example, represented by the rear swingarm 17 and/or the rear wheel 6 itself.

Figures 2, 3, 4, 4A:
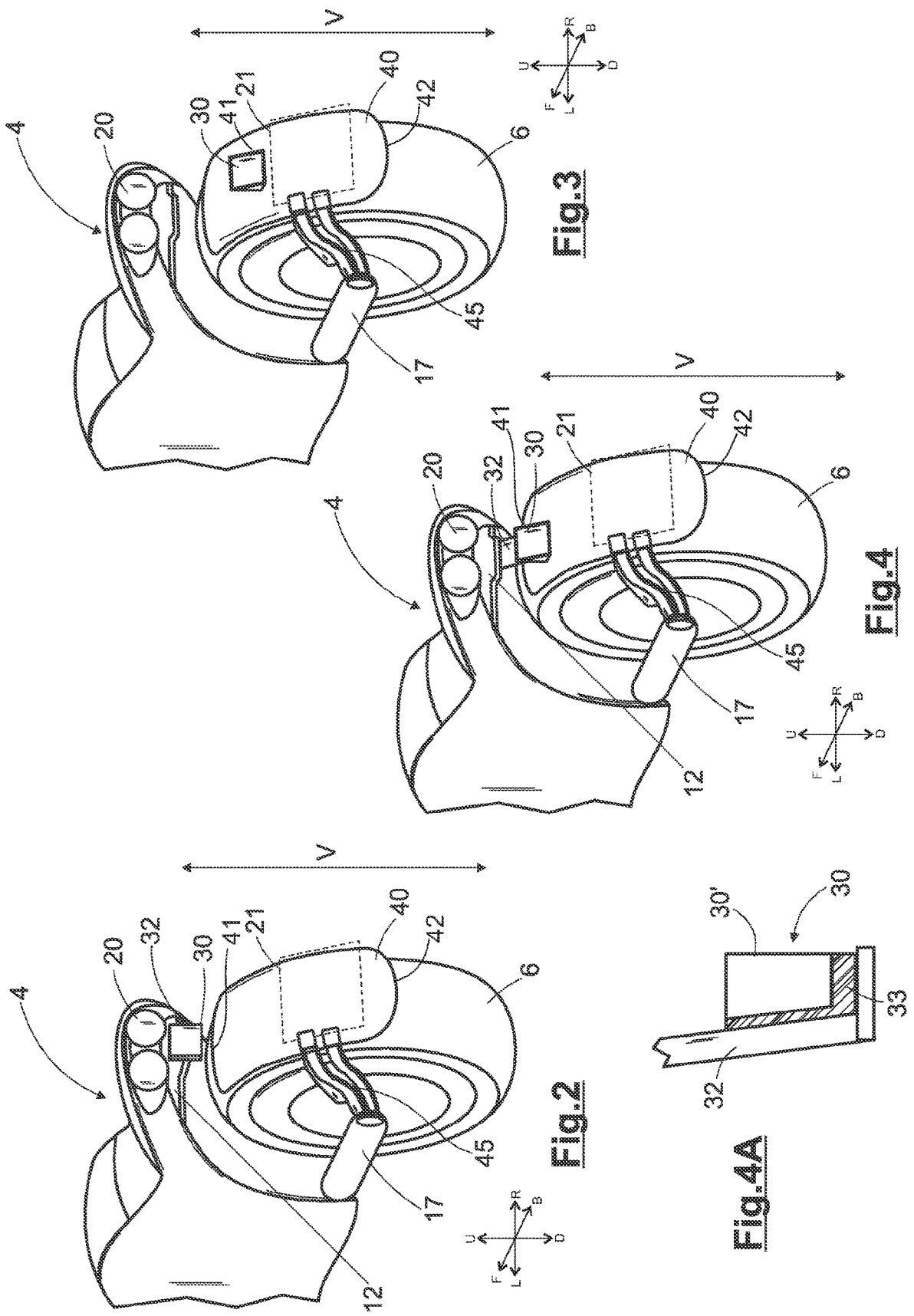
FIGS. 2, 3 and 4 show a rear perspective view of the motorcycle in FIG. 1, in which the detection unit is arranged in three different positions on the rear-carriage of the vehicle.
FIG. 4A shows a diagrammatic view of the detection unit and connecting means.

In particular, in a first embodiment shown in FIGS. 1 and 2, the detection unit 30 is arranged near the taillight 20, in a rear-carriage frame portion 12, and spaced apart from the rear fender 40, the latter being connected to the swingarm 17. Thus, in such a case, the detection unit 30 has a completely unshielded lower space underneath. The rear-carriage frame portion substantially defines the rear-carriage tail of the vehicle extending above the rear wheel 6.

In a second embodiment, shown in FIG. 3, the detection unit 30 is arranged on the rear fender 40 and spaced apart from the taillight 20. In such a case, the detection unit 30 has a free, unshielded upper space above the rear fender 40. In this embodiment, the detection unit 30 is connected to the rear fender 40 by means of suspension means to dampen vibrations from the unsprung mass.

In a third embodiment, shown in detail in FIG. 4, the detection unit 30 is substantially equidistant from the taillight 20 and rear fender 40, being substantially in an intermediate position. In this case, the detection unit 30 comprises a support frame 32—diagrammatically shown in FIG. 4A—which preferably extends from the rear-carriage tail 12, i.e., from the rear body, towards the rear wheel 6. The supporting frame 32 is, for example, substantially L-shaped, and advantageously comprises damping elements 33, e.g., rubber elements, allowing to dampen vibrations of the detection unit 30. As mentioned above, the provision of damping elements 33 which dampen vibrations of the detection unit 30 is advantageously applicable to any of the positioning configurations described above.

In all cases described above, the detection unit 30 is free of shielding from further parts of the vehicle adjacent to it. The radio signal 31 emitted by the detection unit 30 is free to propagate to the rear of the vehicle. The achieved range of view, which is directly a function of the radio signal, makes it possible to increase the efficiency of the detection unit 30.

In the embodiment in FIGS. 1 and 2, the detection unit 30 is arranged aboard a rear-carriage frame portion 12. In this case, the detection unit 30 is arranged integrally with the rear portion 4 of the vehicle. In particular, the detection unit 30 is located below the taillight 20 integrally connected to the rear-carriage frame 12 of the vehicle, as shown in FIG. 2.

In this case, the detection unit 30 is supported, in a first embodiment, by the body frame of the vehicle in a position below the taillight 20; this is rigidly mounted to the rear-carriage frame 12, i.e., the rear-carriage tail of the vehicle, which is a suspended mass thereof. In this embodiment, since the detection unit 30 is connected to the frame, i.e., to one of the suspended masses of the vehicle, the vibrations are damped by the shock absorbers 60 of the vehicle 1. Also in this embodiment, in which the detection unit 30 is arranged near the light 20, as shown in FIG. 1, the detection unit 30 is installed on a supporting bracket 34 connected to the rear-carriage frame portion 12. Again, in this case, damping elements may be provided interposed between the supporting bracket 34 and the detection unit 30 to reduce the vibrations of the detection unit.

In an alternative embodiment, shown in FIG. 3, the detection unit 30 is arranged aboard the rear fender 40. In this case, the detection unit 30 is connected to an unsprung mass 14 of the vehicle, which is not affected by the damping function of the shock absorbers 60. The detection unit 30 is always placed in a position below the taillight 20, but spaced apart from this latter and relative to the tail of the vehicle 1, i.e., the protruding rear part of the vehicle 1. In this case, the detection unit 30 may also be arranged on the license plate holder 21, which in turn is connected to the rear fender 40.

In particular, the unsprung portion of the mass comprises a portion of a swingarm 17. The swingarm 17 is the vehicle element which allows the rear wheel 6 to swing vertically. In this manner, the rear fender 40 connects either directly or indirectly to the swingarm 17 of the vehicle, which is an unsprung mass of the vehicle.

As shown in FIGS. 1-5, a rear fender 40 is provided that extends an arc of circumference around the rear wheel 6. The fender 40 is connected either directly or indirectly to the swingarm 17 of the vehicle.

The rear fender 40 comprises a front edge 41 and a rear edge 42. The rear fender 40 is arranged about the wheel so that the front edge 41 is arranged further to the side than the rear edge 42. The rear fender 30 comprises a portion of the rear wheel 6 lying about within its top and rear quadrant.

The license plate holder 21 is mounted on the fender 40 on the outside in relation to the rear wheel 6. In particular, the rear fender 40 is connected by means of a connecting arm 45 extending from the swingarm 17.

In a preferred embodiment, the fender 40 and associated license plate holder 21 are connected to the swingarm portion 17 by means of at least one connecting arm 45, which in turn is connected to at least one attachment point 46 (FIGS. 1 and 5). The attachment point 46 in a side view of the vehicle is arranged within the volume defined by the rear wheel 6.

The various positioning configurations of the detection unit 30, as described above, make it possible to reduce the probability of false detections within the radio wave emission range 31. In this manner, it is possible to define a free wide-angle region that does not cause any interference with other parts of the vehicle, so that the radio signal 31 can spread evenly; this aspect improves the technical problem of reducing false radar detections.

The description of one or more specific embodiments provided above shows the disclosure from a conceptual point of view so that others, using the prior art, will be able to modify and/or adapt in various applications the embodiments without further research and without departing from the inventive concept, and, thus, it is understood that such adaptations and modifications will be considered as equivalents of the specific embodiment. The means and materials for making the various described functions may be of various nature without departing from the scope of the disclosure. It is worth noting that the terminology or expressions used are only descriptive therefore non-limiting.

The invention claimed is:

1. A rideable saddle vehicle comprising:
   a taillight arranged on a rear-carriage of the vehicle, said taillight being adapted to emit a light beam;
   a rear fender of a rear wheel directly connected to an unsprung mass portion of said rear-carriage;
   a detection unit configured to detect the presence of other vehicles in a zone behind the vehicle;
   wherein said detection unit is directly connected to a rear unsprung mass portion of said rear-carriage.

2. A rideable saddle vehicle according to claim 1, wherein the detection unit is arranged, in a side view of said rideable saddle vehicle, in a position selected from:

a position in which said the detection unit is proximal to said taillight and spaced from said rear fender;

a position in which said the detection unit is proximal to said rear fender and spaced from said taillight;

a position in which said the detection unit is substantially equally spaced from said taillight and said rear fender.

3. A rideable saddle vehicle according to claim 1, wherein said detection unit is arranged aboard a rear-carriage frame portion.

4. A rideable saddle vehicle according to claim 3, wherein said detection unit is arranged on a supporting bracket, said supporting bracket is connected to a rear-carriage frame portion.

5. A rideable saddle vehicle according to claim 4, wherein said supporting bracket comprises damping elements adapted to damp the vibrations of the supporting bracket and/or of said detection unit while driving.

6. A rideable saddle vehicle according to claim 5, wherein said damping elements are rubber elements arranged at an attachment portion of said supporting bracket and/or in a position interposed between said supporting bracket and said detection unit.

7. A rideable saddle vehicle according to claim 1, wherein the detection unit is arranged aboard said rear fender.

8. A rideable saddle vehicle according to claim 7, wherein said detection unit is arranged on a license plate holder installed on said rear fender.

9. A rideable saddle vehicle according to claim 8, wherein said rear fender is connected to a connection portion of a swingarm by a connection arm, having said connection portion being arranged, in a side view, inside a volume defined by a rear wheel.

10. A rideable saddle vehicle according to claim 1, wherein said unsprung mass portion is a portion of a rear swingarm which connects a rear wheel to the vehicle frame.

11. A rideable saddle vehicle according to claim 1, wherein the rear fender extends an arc of circumference about the rear wheel and is connected either directly or indirectly to the rear wheel so as to have the same sussultatory movement.

\* \* \* \* \*